S. R. McKAY.
CONCRETE FORM.
APPLICATION FILED NOV. 7, 1919.
Reissued Feb. 24, 1920.
14,807.
2 SHEETS—SHEET 1.
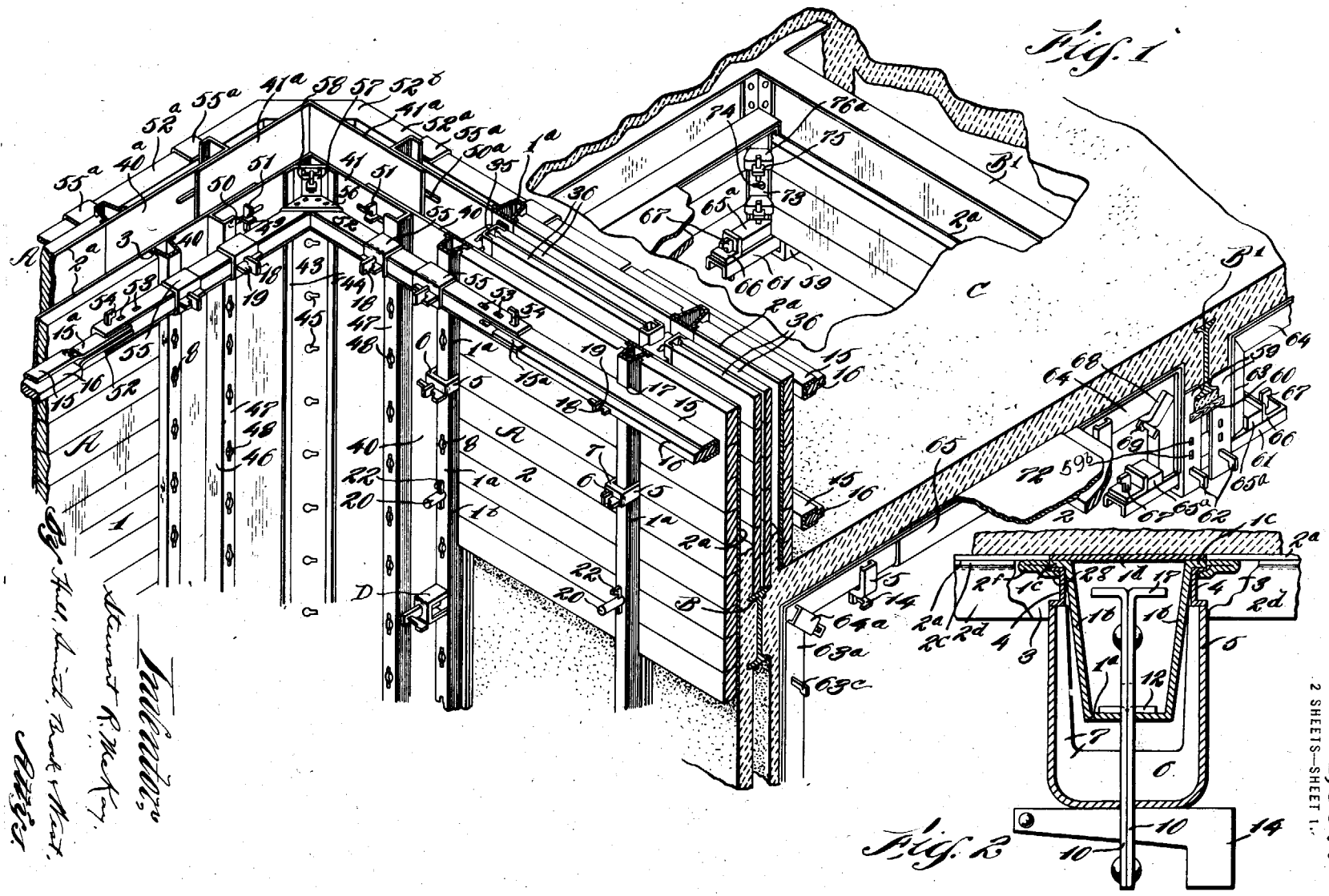
Inventor,
Stewart R. McKay,
By Hull, Smith, Brock & West,
Attys.

S. R. McKAY.
CONCRETE FORM.
APPLICATION FILED NOV. 7, 1919.
Reissued Feb. 24, 1920.
14,807.
2 SHEETS—SHEET 2.
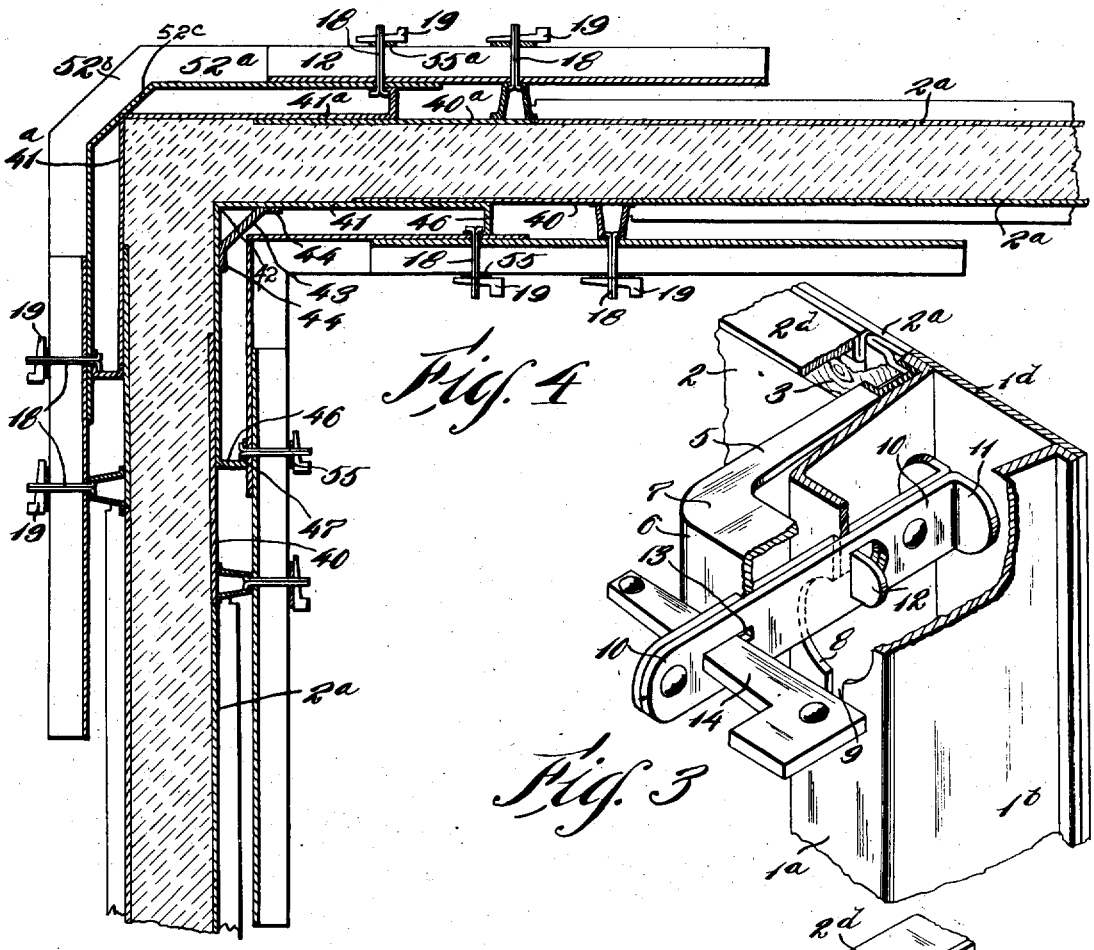
Fig. 4
Fig. 3
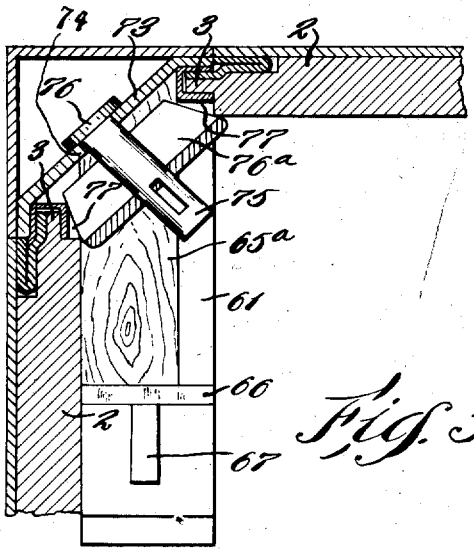
Fig. 5
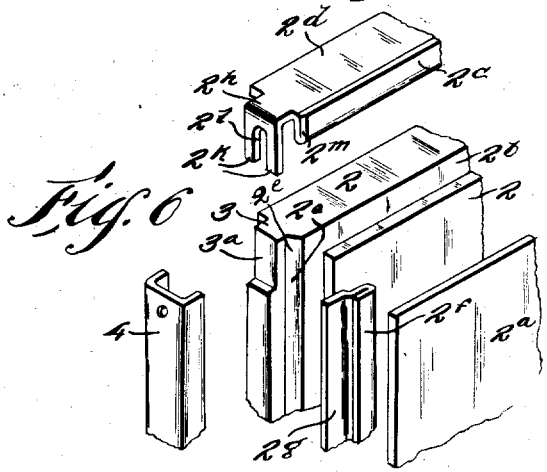
Fig. 6
Inventor,
Stewart R. McKay,
By Hull, Smith, Brock & West,
Attys.

UNITED STATES PATENT OFFICE.

STEWART R. McKAY, OF CLEVELAND HEIGHTS, OHIO, ASSIGNOR TO McKAY CONCRETE FORM COMPANY, OF SEWAREN, NEW JERSEY, A CORPORATION OF NEW JERSEY.

CONCRETE-FORM.

14,807. Specification of Reissued Letters Patent. Reissued Feb. 24, 1920.

Original No. 1,300,435, dated April 15, 1919, Serial No. 872,648, filed November 17, 1914. Application for reissue filed November 7, 1919. Serial No. 336,468.

*To all whom it may concern:*

Be it known that I, STEWART R. McKAY, a citizen of the United States, residing at Cleveland Heights, in the county of Cuyahoga and State of Ohio, have invented a certain new and useful Improvement in Concrete Forms, of which the following is a full, clear, and exact description, reference being had to the accompanying drawings.

This invention relates to forms or frames that are employed for the purpose of molding walls, ceilings, arches, or other shapes of concrete or composition materials, in which forms or frames the material may be placed in a wet and semi-plastic condition and allowed to set and harden. It is the general object of the invention to provide a frame or form which is adapted not only for the ordinary flat wall construction but which possesses great flexibility, whereby it may be used, with a minimum of alterations and additions, for various jobs incidental to building and other constructions. The invention contemplates the use of a unit (having a pair of posts, an interposed plate, and clamping devices for securing the plate to the posts) which unit is particularly well adapted for simple flat-wall construction or simple arch construction. In addition to this unit (which in its broad aspect is set forth in my application No. 704,472 filed June 19, 1912) the invention herein contemplates the employment of coöperating features of construction whereby the corners of walls may be conveniently and economically constructed. Further and more limited objects of the invention will appear hereinafter in connection with the detailed description and will be set forth, in the essential combinations of elements, in the claims hereto annexed.

In the drawings forming part hereof, Figure 1 represents a perspective view showing my invention as employed in the construction of side walls, vertical corners, ceilings, and horizontal corners; Fig. 2 is a detail in section and Fig. 3 a detail in perspective, with parts broken away, of one of the clamping devices by which the plates may be secured to opposite sides of a post; Fig. 4 is a horizontal sectional view of my form as employed in the construction of a vertical corner and the side walls adjacent thereto; Fig. 5 is a detail of a corner clamping device for the mold plates; and Fig. 6 a detail in perspective of the top and one of the lateral edges of a mold plate showing the preferred construction of the metal reinforcement therefor.

Describing by reference characters the various parts illustrated herein 1, 1 denote the outer faces of hollow metallic posts and 2 the interposed removable plate of one of the units referred to hereinbefore. The term "plate" is employed herein in its generic sense, and it is not intended by the use of this term (except as hereinafter set forth) to limit the "plate" to any particular kind of material, leaving to the judgment of the builder the material which may seem most suitable for any molding operation. The particular plate which is illustrated herein comprises a plurality of boards having their inner faces and their top and bottom edges provided with a smooth metallic lining (preferably steel) indicated at $2^a$ and $2^d$. The lateral edges of the boards are reduced to provide a shoulder or tenon 3 which is inclosed within and protected by a metallic channel 4 (see Figs. 2 and 6). The details of this metallic protection will be described hereinafter. The lateral edges of the plate are thus protected by the channel iron, and the plate is adapted to be inserted between the sides of the posts, which posts are preferably of channeled metal having the web $1^a$ presented outwardly (or away from the work) and the inclined sides $1^b$ coöperating with the lateral edges of the plates to provide an increasing clearance between such edges and such lateral opposed sides as the plate is moved outwardly, or away from the work. At their inner ends the sides $1^b$ are turned outwardly, as shown at $1^c$, forming a surface against which the channeled edges 4 of the plates may rest when the latter are clamped in place, making a tight joint through which the concrete cannot leak. A plate $1^d$ extends across and closes the space between the flanges $1^c$, being secured thereto in any suitable manner.

Coöperating with each pair of posts 1 and the interposed plate or plates 2 is a "ranger" 15 which may be secured to the posts and associated therewith and which serves to position and, in effect, to assemble the posts in proper relation to receive there-between the molding plate.

For the purpose of securing the plates between the posts, I prefer to employ clamps of the character illustrated in Figs, 1, 2 and 3. Each of these clamps comprises a U-shaped yoke having the inwardly projecting legs 5 and the connecting web 6. The legs are adapted to engage the channels 4 at the edges of adjacent plates 2 and thereby to force such plate edges against their seats upon the posts. The yoke may be made of channeled or flanged metal, the flanges being indicated at 7. For the purpose of forcing the yokes inwardly against the channeled tenons of the plates, I prefer to employ a special locking device for the yokes, which locking device may be capable of an adjustment enabling the yokes to be turned at right angles to their locking position and in line with the posts and resting against the outer or webbed face 1 thereof. For the purpose of securing these yokes in various positions along the posts, I provide the posts with a suitable number of key-hole slots comprising each a central circular opening 8 and a pair of narrow slots 9 extending in opposite directions therefrom lengthwise of the posts. Each key-hole slot is adapted to receive a bolt which forms part of the locking device for the clamp. The bolt is shown in detail in Figs. 2 and 3 and is conveniently constructed from two metal plates 10, 10 riveted together. At their inner ends, these plates are rounded and bent outwardly, as shown at 11, to form a head. Intermediate of their ends, the plates are provided with outwardly pressed tongues 12 constituting a head of less width than the head formed by the projections 11. At its outer end, the bolt formed by the plates 10 is provided with a slot 13 which is adapted to receive a wedge key 14. The head 11 is of greater diameter than the central part 8 of the key-hole slot while the head 12 is of less diameter than such central opening. In assembling, it will be necessary to insert the bolts before the plate $1^d$ is applied to the post. The operation will now be apparent, especially in connection with Figs. 2 and 3, wherein the yoke and bolt are shown in the positions which they occupy when the parts are locked in place by the yoke, the key 14 being driven into the slot 13 so as to hold the ends of the yoke legs in engagement with the channeled tenons 4 and the bolt having been moved into one of the narrow slots 9 of the key-hole opening, whereby the head 12 will be in engagement with the inner surface of the web of the post. When the molding operation has been finished, the key 14 is driven out a sufficient distance to enable the bolt to be moved into the central opening 8. The bolt and the yoke may then be moved outwardly, the bolt being retained in place in central position by the engagement of the head 11 with the opposite sides of the central opening 8. The distance between the heads 11 and 12 is such that when the head 11 is in engagement with the web $1^a$, the ends of the legs 5 of the yoke will clear the outer surface of this web, enabling the yoke and the bolt to be turned at right angles to the positions shown in Figs. 2 and 3, whereupon, by driving in the key 14, the yoke may be retained against the outer face of the post with the ends of the legs 5 bearing against said face—see the clamp marked D, Fig. 1. The yoke and keys will then extend longitudinally of the posts—a position wherein they are accessible for re-use and wherein they do not materially interfere with the shifting or transportation of the posts.

As I have before stated, a pair of posts 1 with a coöperating plate 2, and securing yokes 5 to secure the plate 2 to the post 1, I term a unit.

I prefer to construct the ranger, for ordinary work, from a metallic channel $15^a$ having its flanges projected outwardly and having therewithin a wooden filler block 16. The filler block as its name indicates forms a filling for the channel $15^a$ and forms a body to accommodate the bolts 18 as later explained.

Where used in ordinary wall or arch construction, the ranger will extend in this form across a pair of posts and the interposed metal plate, being provided in its inner surface with notches 17 which are adapted to receive therewithin the outer faces of the said posts, thereby conveniently to position the rangers with reference to the posts and prevent lateral movement between the posts and the ranger. For connecting the ranger to the posts, I may use a bolt 18 similar to the bolts 10–13 hereinbefore described, except that but one head (the smaller one) will be necessary in ordinary wall or arch construction, the wedge key 19 bearing directly against the wood filler 16. However, where the ranger is extended to coöperate with a corner construction, such as shown in Fig. 1, the wooden filler block 16 will preferably be omitted in such extension and a saddle may then be employed similar to the yoke shown in Figs. 2 and 3 and secured to the post in like manner as by a bolt 18. This special ranger construction will be referred to hereinafter in connection with the details of the form as applied to corner construction.

The description has thus far been confined to but one side of the form or mold, it being obvious to those skilled in this art that the opposite side of the form will be constructed in substantially identical manner and that the opposed sides will be connected by suitable stay bolts. For the purpose of so connecting the sides, I prefer to employ hollow elliptical stay bolts 20 having openings through the ends thereof for the reception of wedge keys 22.

On the left side of Fig. 1 my form is shown as applied to a wall corner and for this purpose each side of the form is shown as comprising a pair of units A with the interposed corner molding members, with such modifications of the rangers as will adapt them for use in connection with the said members. The corner molding construction comprises a pair of plate members 40 each having one lateral edge extending in proximity to and preferably forming a cover for the inner face of the "unit" post which is adjacent to the corner; the opposite lateral edge of each of these plate members overlaps the outer lateral edge of the adjacent member of a metallic corner section, the first-mentioned plate member constituting adjustable bridges between the unit posts and the corner section, which will now be described, with particular reference to the inside corner construction. 41 denotes a pair of plate members preferably cast or formed integrally with each other and arranged at the desired angle to constitute an angle section adapted for the particular wall corners to be molded. Across the corner or angle 42 between these plates there extends a web 43 which is provided with lateral flanges 44 whereby it may be secured to the plates 41. This web constitutes in effect a post to which the angle between the corner ranger sections may be secured, and said web is provided with a vertically arranged series of key hole slots 45, which extend transversely of the web and preferably with the circular portion of the slot at one side of the longitudinal central line of the web and the reduced portion extending across such line. At their outer or corner-remote edges, the plate members 41 are bent into channel form to provide hollow vertical posts 46 and the flange 47 which is parallel with the body of the plate is provided with key hole slots 48 similar to the slots 8 in the "unit" posts.

In order to secure the plate members 40 and 41, one of these plate members (as 40) is provided with a bolt or bar 49 projecting therefrom and adapted to be inserted in a slot 50 (preferably in the plate 41). A wedge key 51 can be driven through an aperture in the bar or bolt 49 and thus connect the plate members 40 and 41.

I contemplate using my ranger construction with the plate members 40 and 41 and I preferably employ the construction shown herein as the means for extending the ranger construction from the units to and including the corner extension. At the ends which are presented toward the corner, the ranger channels 15 are contracted in width, as shown at $15^a$, which enables them to be received conveniently within the corner ranger channel comprising the two angularly disposed channel branches 52. For convenience of construction the channel is arranged with the channels presented outwardly, and the necessary adjustability of the corner ranger with respect to the unit rangers may be secured by means of apertures 53 in the top and bottom flanges which coöperate with apertures in the reduced ends $15^a$ of the unit rangers and with a locking wedge key 54. In order to secure these outwardly opening channels to the post faces $1^a$ and 47 and at the same time employ substantially the same fastening means that are employed with the rangers 15 and 16, channeled saddles 55 are provided which are adapted to be applied to the rangers 52 with their webs extending across the opening between the flanges, said webs forming bearings for the wedge keys 19 the construction of which and the bars 18 is the same as the like-designated parts of the unit. In order to support the ranger from the corner proper, a gusset 56 may be provided for the angle between the branches 52, said gusset extending across the top of the upper flanges of the ranger branches. This gusset is provided with a vertically extending channel 57 having its flanges presented inwardly, or toward the corner, and this channel is provided with an opening through which a locking bolt (secured to the web) may extend, said bolt being provided with an aperture for the wedge key 58.

In Fig. 4 there is shown a horizontal sectional view of my form as applied to the corner, the view being taken through the ranger and showing the outer portion of the mold frame. In this view the parts of the outer corner frame which correspond to the inner frame are given the same designating numerals as the inner corner-frame parts, with the exponent "a". The clamping devices for the rangers, being identical with those used with the inner frame section, will be given the same identifying characters. The ranger sections 52, instead of meeting at right angles to each other (as is the case with the inner corner ranger sections) are connected by an intermediate section $52^b$ which extends at substantially 135° from each section $52^a$ and is so arranged that its inner face $52^c$ will abut against the corner between the plates $41^a$.

At the right hand of Fig. 1 my form is shown as arranged and adapted for ceiling construction, including the inclosing and protecting of a depending ceiling beam. The form which is shown as applied to the ceiling is essentially the same as that employed for curved or flat arch construction, the detailed construction being shown, described and claimed in my application, Serial No. 137,089 filed Dec. 15, 1916, Patent No. 1,236,852, Aug. 14, 1917. In Fig. 1, B and B′ represent two of the structural I-beams employed in building construction one of which beams, B, is shown as embedded in one of the walls or partitions; the other beam, B′, is of such depth as to extend below the ceiling C proper and hence need to be inclosed within a special depending part of the ceiling. 59 denotes a pair of brackets each of which is recessed whereby they may be applied to and suspended from the lower flange of the I-beam B′; beneath the recesses for the I-beam flange, the brackets are further recessed for the reception of the board 60 which forms the bottom of the mold which extends about and includes the lower flange of the I-beam. Supported by the brackets is a carrier for the lower ends of the vertical posts of the ceiling form. This carrier or base may be conveniently formed from a channel section 61 which may be inserted through the brackets 59. This carrier or base may be supported in any desired position, as by means of openings (not shown) in the depending channel flanges which are adapted to aline with the opening 59[b] and to receive wedge keys 62 inserted through such openings. The web of the carrier 61 will support the lower ends of the short vertical posts 63, which posts merge at their upper ends with and support the transversely extending post sections 64. The lower ends of the posts 63 may each be secured and braced upon the top of the carrier by means of a block 65 (preferably of wood) bearing at one edge against the post and braced thereagainst by means of an angle plate 66 and a wedge key 67 driven through an opening in the base of said plate and an opening in the web of the carrier 61. The posts 63 may be provided with clamping devices similar to those employed upon the vertical posts 1, one of these devices being indicated at 5. It will be obvious that the construction described hereinbefore as applicable to the lower flange of an I-beam may be applied in the same manner to the lower flange of a T-beam.

At the corner formed between each upright post 63 and the horizontal transversely extending post section 64, a clamp for the side and ceiling plates is provided, said clamp being indicated generally at 68 and being substantially identical with the clamps 5, 6, 14, and 19 heretofore described, the only difference being that the bolt 69 extends through an opening in the corner formed between the post 63 and the transverse section 64, providing a corresponding inclination for the clamp 68 whereby it may operate upon the ends of the vertically and horizontally arranged plates.

In Fig. 1 the construction is shown as applied to the corner of a ceiling and to the space between one of the beams which is to be protected and a side wall by means of openings in the flanges of the posts which are adapted to receive a wedge key 63[c]. At its upper end the post 63[a] merges with and supports a transverse post section 64[a], similar to the post section 64. A corner clamp 68 is provided which is similar to the like designated clamp on the post 63. The post sections 64 are provided with clamps which are substantially identical with those for the vertical wall unit form shown in Fig. 1 and are designated in like manner. The opposed ends of the post sections 64, 64[a] telescope within an interposed post section 65 which supports a plate 72. For ordinary straight ceiling construction, the posts 63, 63[a], 64, 64[a] and 65 and the clamping members associated therewith will be duplicated whereby the ceiling and the beam-inclosing mold plates will be carried by and between a pair of similarly constructed supports each comprising a pair of vertical posts with adjustable transverse posts connected thereto. However, when operating upon the corner of a room, it will be necessary to modify the supporting construction in the manner shown in Figs. 1 and 5. In this case, brackets 59 are suspended from the beam B′ in the same manner as shown at the right hand end of Fig. 1 and these brackets carry the channeled base 61 with the angle plate 66 and the wedge key 67, the wooden block 65[a] in this case being beveled at its inner end to bear against the corner web 73, which is similar to the web 43 and which constitutes a vertical corner post for the form. This web is provided with a vertical series of horizontally disposed key hole slots 74 which are adapted to receive bolts 75 having heads 76 adapted to be inserted through the enlarged portions of the slots and to be engaged by the metal surrounding the reduced portions of the slots. At their outer ends, the bolts 75 are adapted to extend through an opening provided in an angle clamp 76[a] the opposite beveled ends 77 whereof are adapted to engage the ends of the plates 2, thereby to retain them in place.

For reinforcing the mold boards or plates, I prefer to use the construction illustrated in detail in Figs. 2, 3 and 6. Each mold board or plate 2 is provided with a score 2[b] at the top and bottom thereof and at a short distance within the inner face. This score is adapted to receive the depending flange 2[c] of the top or bottom plate 2[d], which flange may be conveniently formed by folding the metal upon itself, whereby the thickness of the flange is double that of the metal. A vertical score 2[e] is provided at each lateral edge of the mold board or plate which vertical scores merge with the scores $2^b$. These vertical scores are adapted to receive a vertical flange $2^f$ of a narrow reinforcing plate, which flange is similar in construction to the flange $2^c$. The body of the plate projects laterally from the flange, as indicated at $2^g$, and this portion $2^g$ extends alongside of and protects the adjacent inner face of the tenon 3. Each top and bottom plate $2^d$ is provided at each end with a shouldered extension $2^h$ which is of substantially the same length as the top and bottom of the tenon 3 and is of the same width as said tenon, including the additional width due to the reinforcing plate $2^g$: At its outer end, each shoulder $2^h$ is bent at substantially right angles to provide a retaining hook or flange $2^k$, which may be received within a rabbet $3^a$ at the upper or lower end of each tenon 3. Each retaining flange $2^k$ may be slotted, as shown at $2^l$, for the reception of the screw by means of which the channel 4 is secured to the tenon.

When assembled, the plate $2^d$ is on top (or on the bottom) of the mold plate or board with its flange $2^c$ seated within the appropriate score $2^b$. The flange $2^f$ is seated within the vertical score $2^e$ with the extension $2^g$ fitting alongside the inner surface of the tenon 3, the flange $2^c$ being cut away, as indicated at $2^m$, to accommodate the upper end of the flange $2^f$. The channel 4 extends around the tenon 3 and the plate $2^g$. The lining plate $2^g$ may be secured in place by spot welding to the flanges $2^f$. This construction insures sufficient protection for the wood or other material of which the mold plate or board may be composed.

For convenience of description and of drawing certain of the claims, the mold plate will be assumed to be in a vertical position, in which case the lateral or side edges will be provided with shoulders or tenons and the top and bottom edges with the protecting plate $2^b$. I do not propose, however, to be limited by such convenient descriptive language to the use of these plates only in the construction of vertical walls, such limitation being contrary to the spirit of the invention, and especially to the ceiling or arch construction disclosed hereinbefore.

From the foregoing description, taken with the drawings, it will be evident that I have produced a concrete form which is extremely flexible, and that, in most uses of the form, I am enabled to employ a unit consisting of a pair of posts with a mold plate adapted to be inserted and clamped therebetween in various adjusted positions along said posts, with rangers connected with the posts whereby they are retained in assembled and properly alined positions, and that I am able to employ with such units suitable corner extensions whereby the form may be conveniently adapted for forming corner portions of walls; also to provide such unit construction with such extensions as will adapt it for use with ceiling or arch molding, including the inclosure and protection of beams; and further that I am able to combine these features in a particularly simple and flexible construction.

While I have necessarily illustrated and described my invention in detail, it will be obvious that such details may be departed from more or less without affecting the spirit of my invention; and I therefore do not propose to be limited to such details except as they may be positively included in the claims hereto annexed or their inclusion may be rendered necessary by the state of the prior art.

Having thus described my invention, what I claim is:

1. In a form of the character described, the combination of a pair of units comprising each a pair of posts and a plate removably and adjustably connectible therebetween, a corner ranger comprising two members forming an angle with each other, a ranger member connectible to the posts of each unit and adjustably connectible to an adjacent member of the corner ranger, and a corner section having posts to which the corner ranger may be connected.

2. In a form of the character described, the combination of a pair of units comprising each a pair of posts, a plate removably and adjustably connectible therebetween, a corner ranger comprising two members forming an angle with each other, a ranger member connectible to the posts of each unit and adjustably connected to the adjacent member of the corner ranger, and a corner plate to which the corner ranger may be connected.

3. In a form of the character described, the combination of a pair of units each unit comprising a pair of posts and an interposed plate removably and adjustably connectible therebetween, a corner section interposed between said units, a plate member interposed between a post of each unit and the adjacent lateral edge of the corner section and adapted to be overlapped by the corner section, the corner section being provided with posts, a corner ranger comprising an angular section corresponding to the corner section, means for connecting the ranger to said posts, ranger sections adjustably connected to the ends of the corner ranger, and means for connecting the ranger sections to the posts of the units.

4. In a form of the character described, the combination of a pair of units each comprising a pair of posts and an interposed plate removably and adjustably connectible therebetween, a corner section interposed between said units, a plate member interposed between a post of each unit and the adjacent lateral edge of the corner section, said plate member being adapted to overlap the corner section, posts on the corner section, a corner ranger corresponding to the corner section, means for connecting the corner section to said posts, ranger sections adjustably connected to the ends of the corner ranger and means for connecting the ranger sections to the posts of the units.

5. In a form of the character described, the combination of a pair of units each comprising a pair of posts and an interposed plate removably and adjustably connectible therebetween, a corner section coöperating with said units, a plate member interposed between the post of each unit and the adjacent lateral edge of the corner section, said plate members being adapted to overlap the corner section, and means for connecting said units and said corner section.

6. In a form of the character described, the combination of a pair of units each comprising a pair of posts and a plate adjustably connectible therebetween, a plate member extending from one of the posts of each unit, a corner section comprising a pair of angularly disposed plate members adapted to overlap the adjacent lateral edges of the first mentioned plate members, and means for connecting said plate members and said units in various adjusted positions thereof.

7. In a form of the character described, the combination of a pair of angularly arranged units each comprising a pair of posts and a plate adapted to be interposed therebetween and to be adjustably connected thereto, a pair of plate members projecting from the adjacent posts of said units, a corner section comprising a pair of angularly disposed plate members having the outer edges in overlapping relation to the edges of the first mentioned plate members, and means for adjustably connecting said units and said plate members.

8. In a form of the character described, the combination of a unit comprising a pair of posts and a plate adjustably connectible therebetween, a corner section adapted to coöperate with said units, and means for adjustably connecting the unit and the corner section.

9. In a form of the character described, the combination of a unit comprising a pair of posts and a plate adjustably connectible therebetween, a pair of adjustably connectible plate members extending from one of said posts and means for adjustably connecting said unit and said members.

10. In a form of the character described, the combination of a unit comprising a pair of posts and a plate adjustably connectible therebetween, a pair of adjustably connectible plate members extending from one of said posts, one of said plate members having a post, an extensible ranger, and means for connecting said ranger to said posts.

11. In a form of the character described, the combination of a unit comprising a pair of posts and a plate adjustably connectible therebetween, a pair of adjustably connectible plate members extending from one of said posts, one of said plate members having a post and means for connecting the last-mentioned post to one of the first mentioned posts.

12. In a form of the character described, the combination of a pair of units each comprising a pair of posts and a plate adapted to be adjustably connected therebetween, means for maintaining said units at an angle with respect to each other said means comprising a corner ranger the branches whereof are connectible to the adjacent unit posts, a corner section comprising a pair of angularly disposed plate members each having an outwardly projecting post, a web extending across the angle between said members, means for connecting the corner ranger to said web and to the last mentioned posts, and plate members adjustably connected to the members of the corner section and adapted to extend between the same and the adjacent unit posts.

13. In a form of the character described, the combination of a pair of units each comprising a pair of posts and a plate adapted to be adjustably connected therebetween, means for maintaining said units at an angle with respect to each other, said means comprising a corner ranger the branches whereof are connectible to the adjacent unit posts, a corner section comprising a pair of angularly disposed plate members, means for connecting the corner ranger to said corner section, and plate members adjustably connected to the members of the corner section and adapted to extend between the same and the adjacent unit posts, the corner section being provided with posts, and means for connecting the corner ranger to the last-mentioned posts.

14. In a form of the character described, the combination of a unit comprising a pair of posts and a plate removably and adjustably connectible therebetween, a plate member projecting from one of said posts and adapted to form an extension of the unit plate, a second plate member adjustably connectible to the first mentioned plate member, a post carried by one of said plate members, and an extensible and collapsible ranger connected to said posts.

15. In a form of the character described, the combination of a plurality of posts, plates insertible therebetween and adapted to provide jointly a support for concrete material, means for connecting said plates to the post by means readily disconnected whereby the molding surface provided thereby is extensible and collapsible, an extensible and collapsible ranger, and means for connecting the same to said posts.

16. In a form of the character described, the combination of a pair of posts, a plate insertible therebetween, means coöperating with said posts for securing said plate thereto, a longitudinally extensible and collapsible ranger, and means for connecting the same to said posts.

17. In a form of the character described, the combination of a pair of posts, a plate insertible and removable between said posts, said plate having tenons or shoulders projecting from its opposed lateral edges, channeled members inclosing said tenons or shoulders and clamping means associated with said posts and adapted to engage said channeled members.

18. In a form of the character described, the combination of a pair of posts, each having a lateral seat, a plate having its lateral edge provided with an outwardly projecting shoulder or tenon the inner faces of said shoulders or tenons being adapted to engage said seats, and clamping means coöperating with each post to engage the outer surface of the shoulders or tenons at the adjacent lateral edge of the plate.

19. In a form of the character described, the combination of a pair of posts the opposed faces whereof are inclined inwardly and toward each other, a plate adapted to be interposed between said posts and having at each lateral edge a shoulder coöperating with the inclined surface of a post thereby to provide an increasing clearance between said shoulders and the opposed faces of the posts as the plate is moved outwardly, and clamping means coöperating with each post and adapted to engage the adjacent shoulder on the plate.

20. In a form of the character described, the combination of a pair of posts each having a lateral seat, said seats facing each other, a plate adapted to be interposed between said posts and to coöperate with said seats and having a tenon or shoulder at each lateral edge, a channel shaped metal covering for each of said shoulders, and clamping means coöperating with each post and adapted to engage the adjacent tenon or shoulder.

21. In a form of the character described, the combination of a hollow metallic post having a plurality of key-hole slots therein, a clamping device comprising a forked member the branches of which are adapted to extend on opposite sides of the post, a bolt having a pair of longitudinally spaced heads located within said post, one of said heads being of greater diameter than the enlarged portion of the key-hole slot and the other head being of smaller diameter than the enlarged portion of said slot, said bolt being adapted to extend through the web of said forked member and provided with a slot, a wedge key adapted to be driven through the slot in said bar and mold plates supported thereby.

22. In a form of the character described, the combination of a post, a forked clamping member coöperating with said post, means for securing said member to said post with its legs or branches on opposite sides thereof, mold plates supported thereby and means whereby said member may be secured to the post in another position with the ends of the legs or branches bearing against the outer surface of said post.

23. In the form of the character described, the combination of a post, mold plates on each side thereof, a forked clamping member adapted to be applied to said post with its legs or branches straddling the same, a bolt projecting through said post and connected to said clamping member, and means whereby said bolt may anchor the clamping member to the post with the legs straddling the same and engaging the adjacent mold plates and may in another position secure the clamping member to the post with the ends of the forks or legs resting against the outer surface of the post.

24. In a form of the character described, the combination of a hollow metal post having an opening, mold plates coöperating with said post, a forked clamping member adapted to be applied to said post with its legs or branches straddling the same, a bolt projecting through said post opening and connected to said clamping member, means whereby it may be secured to the post with its outer end projecting at varying distances from the outer surface of the post, and means coöperating with the bolt and adapted to engage the clamping member.

25. In the form of the character described, the combination, of a pair of posts, mold plates therebetween, a ranger coöperating therewith and comprising telescopically connected sections, the overlapping ends of said sections being provided with apertures, a wedge key adapted to be inserted in said apertures, and means for clamping said ranger sections to said posts.

26. In a form of the character described, the combination, of a pair of posts, mold plates therebetween, a ranger coöperating therewith and comprising telescopically connected sections, means for connecting said ranger sections in various adjusted positions thereof, and means for clamping said ranger sections to said posts.

27. In a form of the character described, the combination of a pair of posts, a ranger section connected to one of said posts and comprising a channeled member having a wooden filling block therein, and a coöperating ranger section telescopically connected to the adjacent end of the first mentioned ranger section, the second ranger section comprising a metallic channel shaped member, means extending through the filler block of the first mentioned section and connecting the same to one of said posts, a bolt connected with the other post and extending through the second ranger section between the flanges thereof, a saddle covering the open space between the flanges of the second section and having an aperture for the bolt, and a wedge key driven through the outer end of said bolt and bearing against the saddle.

28. In a form of the character described, the combination of a plurality of posts, a mold plate extending therebetween, a ranger section comprising a channel member having a wooden filling block therein, and a bolt connecting the ranger section to the post and extending through the filling block.

29. In a form of the character described, the combination of an angular post having branches, mold plates having lateral edges adapted to substantially abut against the opposite sides of both branches of said post, and an angular clamp applied to the angular portion of each post and adapted to engage said plates.

30. A mold plate for forms of the character set forth having its opposed lateral edges provided each with a tenon or shoulder, a lining plate applied to the inner face of the said mold plate, a plate insertible between each lateral edge of the lining plate and the mold plate body and having an extension adapted to overlap one of the faces of the tenon, a pair of metallic plates covering respectively the top and the bottom of the mold plate and each having a flange insertible between the top and bottom edges of the lining plate and the corresponding portions of the mold plate and each having extensions covering respectively the tops and bottoms of the shoulders or tenons, and a metallic channel which is adapted to be applied to each shoulder or tenon and to receive therewithin the lateral extensions of the third mentioned plates.

31. A mold plate for forms of the character set forth having its opposed lateral edges provided with shoulders or tenons and each shoulder or tenon having a notch at the top and bottom thereof, a metallic covering plate for the top and bottom of the mold plate, each of said metallic plates having a depending flange at its inner edge and having at each end thereof an extension adapted to cover and protect the corresponding tenon or shoulder and each extension having an angular projection adapted to enter the corresponding recess of the tenon or shoulder, a metallic plate applied to the inner face of the mold plate adjacent to each lateral edge thereof and having an extension projecting alongside of the adjacent face of the tenon, a metallic lining plate for the inner surface of the mold plate having its lateral edges overhanging the inner edges of the last described plates, and a channel member for each tenon or shoulder and adapted to receive therewithin the angular extensions of the top and bottom plates and the tenon-covering extension of one of the third mentioned plates.

32. A mold plate for forms of the character set forth having its lateral edges provided with shoulders or tenons and provided with a metal covering for the inner face and for the top and bottom edges thereof and with a metal covering for the shoulders or tenons.

33. In a form of the character described, the combination of a plurality of posts each having lateral projections upon opposite sides thereof, the projections of said posts being opposed to each other, a mold-plate extending between each pair of posts, each of said mold-plates having surfaces at its lateral edges, adapted to seat upon the projections of the posts, and a unitary clamping means associated with each of said posts adapted to straddle the posts and to engage with the plates to hold the plates in engagement with the projections upon the posts.

34. The combination of a post having lateral seats on opposite sides thereof, a pair of plates adapted to engage said seats respectively, a clamping device extending on opposite sides of said post and having a projection on each side of said post each adapted to engage a plate, and means engaging said post and said device, intermediate of the ends of the latter, for moving the said device toward said plates, thereby to force the said projections into engagement with said plates.

35. The combination of a post having lateral seats on opposite sides thereof, a pair of plates adapted to engage said seats respectively, a clamping device extending on opposite sides of said post and having a projection on each side of said post each adapted to engage a plate, and a wedge engaging the said device and the said post for forcing the said device toward the said plates thereby to bring the projections into engagement with the said plates.

36. The combination of a post having lateral seats on the opposite sides thereof, a clamp adapted to straddle said post, a slotted bolt having a head adapted to engage said post and extending through a slot in said clamp, and a wedge key coöperating with the slot in said bolt to force said clamp toward said seats.

37. The combination of a hollow post having lateral seats on opposite sides thereof, a pair of plates adapted to engage said seats, respectively, a clamp adapted to straddle said post and engage said plates, said clamp having a slot therethrough and said post having an opening and a narrow extension of such opening, a bolt having a head adapted to be inserted in said opening and to engage the walls of the post on each side of such extension, said bolt having a slot therethrough, and a wedge key adapted to be inserted in said slot and to engage said clamp thereby to force the same toward the plates thereby to retain said plates against their respective seats.

38. The combination of a hollow post having lateral seats on opposite sides thereof, a pair of plates adapted to engage said seats respectively, a clamp adapted to straddle said post and engage said plates, said post having an opening and a narrow extension of such opening, a bolt having a head adapted to be inserted in said opening and to engage the walls of the post on each side of such extension, and means coöperating with said bolt and said clamp for forcing the clamp in toward said seats.

In testimony whereof I hereunto affix my signature.

STEWART R. McKAY.